(12) United States Patent
Gerber et al.

(10) Patent No.: US 12,420,499 B2
(45) Date of Patent: Sep. 23, 2025

(54) METHOD FOR PRODUCING A FIBER-REINFORCED, POLYMERIC CONTINUOUS PROFILED ELEMENT

(71) Applicant: REHAU INDUSTRIES SE & CO. KG, Rehau (DE)

(72) Inventors: Nils Gerber, Rehau (DE); Ahmad Al-Sheyyab, Rehau (DE); Stephan Sell, Magdeburg (DE)

(73) Assignee: REHAU INDUSTRIES SE & CO. KG, Rehau (DE)

( * ) Notice: Subject to any disclaimer, the term of this patent is extended or adjusted under 35 U.S.C. 154(b) by 169 days.

(21) Appl. No.: 18/251,796

(22) PCT Filed: Oct. 11, 2021

(86) PCT No.: PCT/EP2021/077987
§ 371 (c)(1),
(2) Date: May 4, 2023

(87) PCT Pub. No.: WO2022/096227
PCT Pub. Date: May 12, 2022

(65) Prior Publication Data
US 2023/0405946 A1 Dec. 21, 2023

(30) Foreign Application Priority Data
Nov. 4, 2020 (DE) .................... 10 2020 129 070.5

(51) Int. Cl.
*B29C 35/10* (2006.01)
*B29C 70/00* (2006.01)
(Continued)

(52) U.S. Cl.
CPC ............ *B29C 70/52* (2013.01); *B29C 70/003* (2021.05); *B29C 70/521* (2013.01);
(Continued)

(58) Field of Classification Search
CPC ............ B29C 2035/0827; B29C 35/10; B29C 70/003; B29C 70/52; B29C 70/521;
(Continued)

(56) References Cited

U.S. PATENT DOCUMENTS

| 4,342,793 A | 8/1982 | Skinner et al. |
| 5,539,012 A * | 7/1996 | Klemarczyk ......... C08F 283/10 428/36.1 |

(Continued)

FOREIGN PATENT DOCUMENTS

| CN | 101831141 A | 9/2010 |
| CN | 105946255 A | 9/2016 |

(Continued)

OTHER PUBLICATIONS

Translation of DE 102016119766 A (published on Apr. 19, 2018).*
(Continued)

*Primary Examiner* — Leo B Tentoni
(74) *Attorney, Agent, or Firm* — Aird & McBurney LP

(57) ABSTRACT

The invention relates to a method for producing a fiber-reinforced, polymeric continuous profiled element (1), wherein the continuous profiled element (1), having preferably at least one hollow chamber (2, 2'), comprises a core profile (10) which can be produced by means of a pultrusion process, and wherein during the pultrusion process at least one continuous strand having reinforcement fibers (5) is integrated into the polymer matrix (4) of the core profile (10). According to the invention, the curing of the core profile (10) is carried out by means of a dual-cure method.

11 Claims, 3 Drawing Sheets

(51) Int. Cl.
    *B29C 70/52*     (2006.01)
    *B29D 24/00*     (2006.01)
    *C08J 5/24*     (2006.01)
    *C08J 7/04*     (2020.01)
    *E06B 3/22*     (2006.01)
    *B29C 35/08*     (2006.01)
    *B29K 33/00*     (2006.01)
    *B29K 67/00*     (2006.01)
    *B29K 77/00*     (2006.01)
    *B29L 24/00*     (2006.01)

(52) U.S. Cl.
    CPC .......... *B29C 70/523* (2013.01); *B29C 70/528* (2013.01); *C08J 5/244* (2021.05); *C08J 7/0427* (2020.01); *E06B 3/22* (2013.01); *B29C 2035/0827* (2013.01); *B29K 2033/12* (2013.01); *B29K 2067/00* (2013.01); *B29K 2077/00* (2013.01); *B29L 2024/00* (2013.01); *C08J 2333/12* (2013.01); *C08J 2377/02* (2013.01); *C08J 2381/02* (2013.01); *C08J 2433/04* (2013.01); *C08J 2467/00* (2013.01); *C08J 2477/00* (2013.01)

(58) Field of Classification Search
    CPC ..... B29C 70/523; B29C 70/528; B29D 24/00; B29L 2024/00
    USPC .................................. 264/136, 236, 477, 495
    See application file for complete search history.

(56) References Cited

U.S. PATENT DOCUMENTS

| 2004/0097611 | A1 | 5/2004 | Nienhaus et al. |
| 2019/0077095 | A1 | 3/2019 | Richardson et al. |

FOREIGN PATENT DOCUMENTS

| DE | 3109424 | A1 | 10/1982 |
| DE | 10143383 | A1 | 3/2003 |
| DE | 102008026161 | A1 | 12/2009 |
| DE | 102011006372 | A1 | 10/2012 |
| DE | 102012108132 | A1 | 3/2014 |
| DE | 102015119700 | A1 | 5/2016 |
| DE | 102016119766 | A1 | 4/2018 |
| DE | 102018111342 | A1 | 2/2019 |
| EP | 2853383 | A1 | 4/2015 |
| WO | 2018072878 | A1 | 4/2018 |

OTHER PUBLICATIONS

European Patent Office as PCT-ISA, English Translation of International Search Report for PCT/EP2021/077987, Jan. 4, 2022.
European Patent Office as PCT-ISA, EnglishTranslation of the Written Opinion of the International Searching Authority for PCT/EP2021/077987, Jan. 4, 2022.
German Patent and Trademark Office, Research Report for DE 102020129070.5, Feb. 2, 2021, with English Translation.

\* cited by examiner

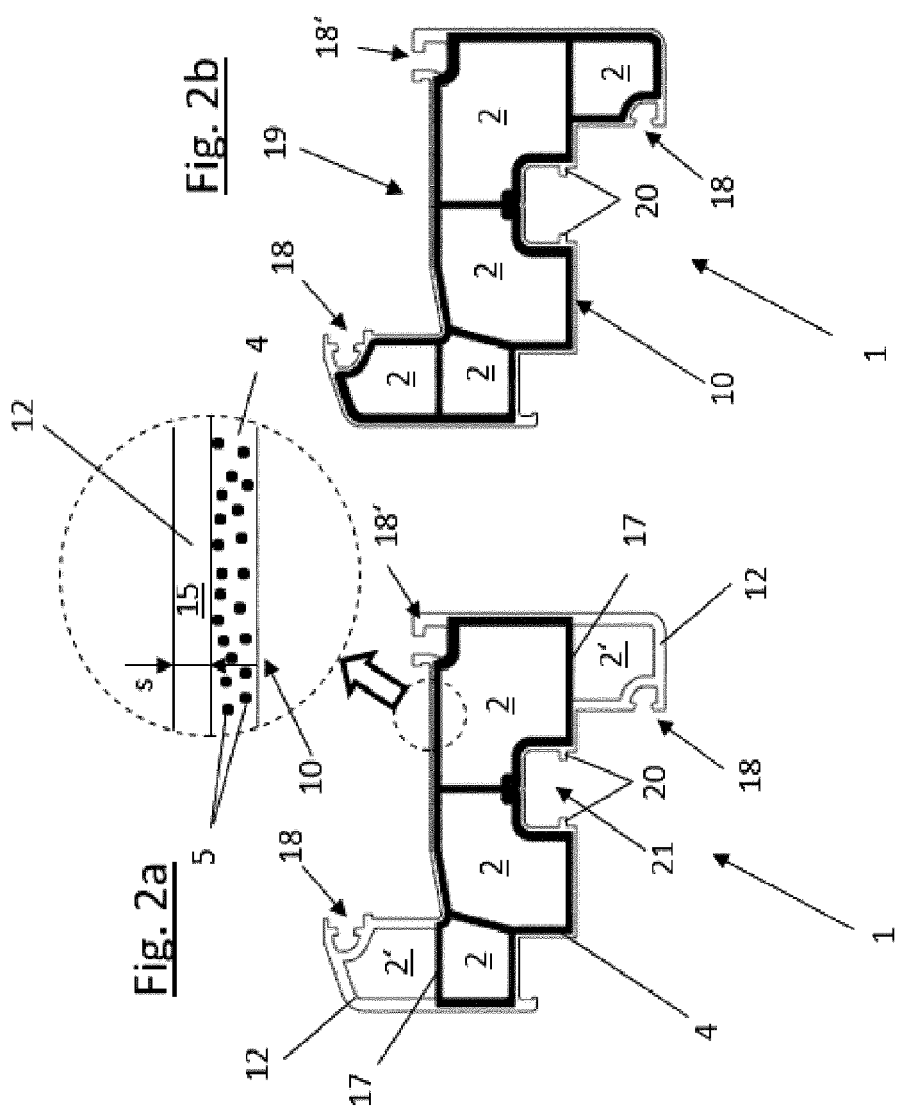

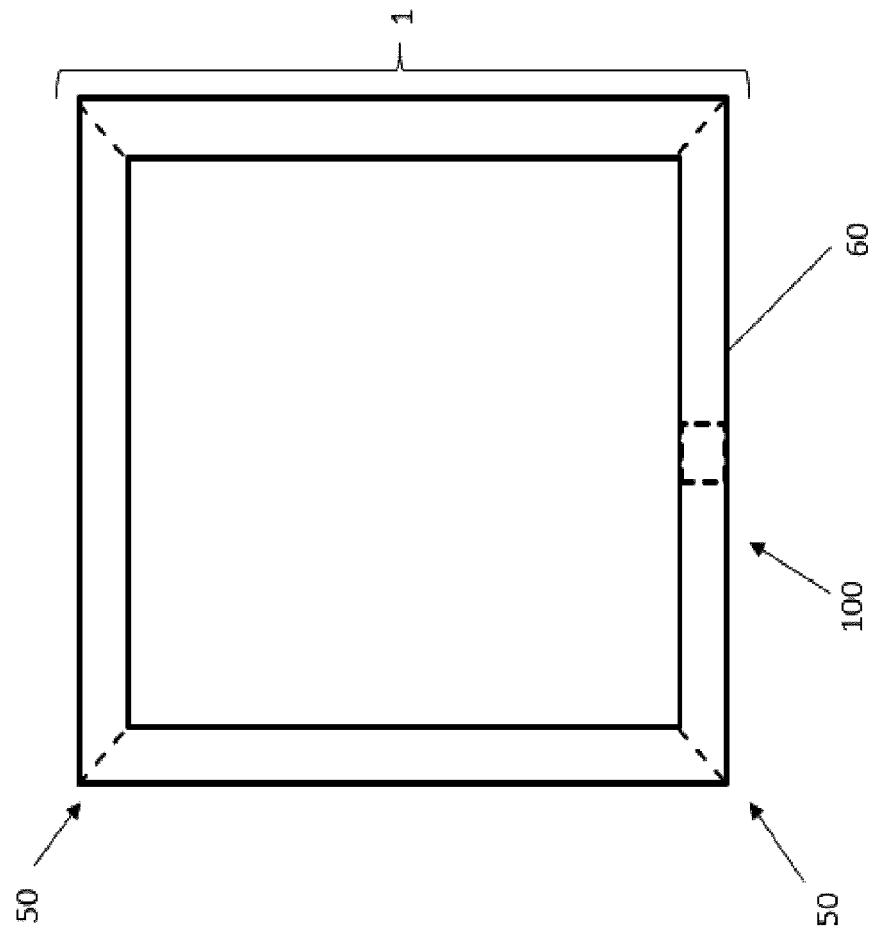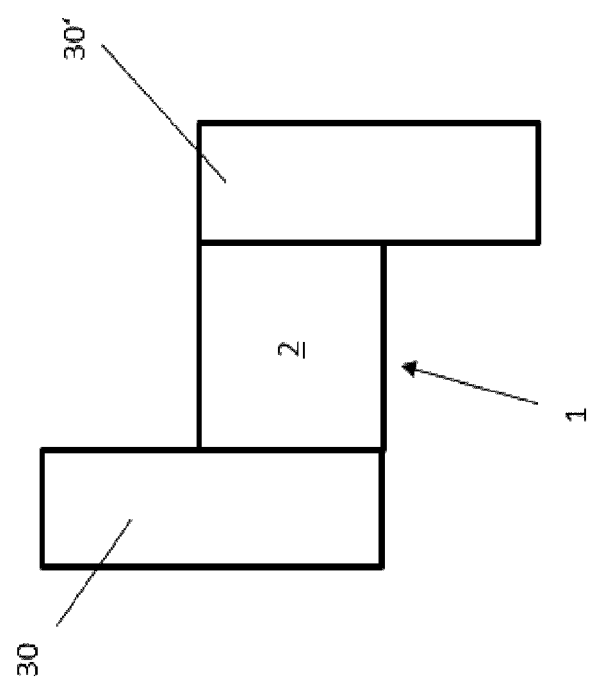

METHOD FOR PRODUCING A FIBER-REINFORCED, POLYMERIC CONTINUOUS PROFILED ELEMENT

FIELD OF THE DISCLOSURE

The invention relates to a method for producing a fiber-reinforced polymeric continuous profile,
wherein the continuous profile, preferably comprising at least one hollow chamber, comprises a core profile which is produced with the aid of a pultrusion process, and
wherein at least one continuous strand having reinforcing fibers is integrated into the polymeric matrix of the core profile during the pultrusion process.

BACKGROUND

A method of this type is known, for example, from EP 2 528 723 B1. With hollow-chambered window and/or door profiles for enclosing glass panes, there is on the one hand the need in general to achieve the best possible thermal insulation, and on the other hand also the requirement for adequate mechanical stability. If a corresponding hollow-chambered window and/or door profile is produced by extrusion from unreinforced thermoplastic material, for example polyvinyl chloride (PVC), it is therefore generally necessary for static reasons to insert a metallic reinforcement profile into at least one of the hollow chambers. However, while this does improve the mechanical stability considerably, this advantage is achieved at the expense of significantly poorer heat insulation properties because the metallic reinforcement profile simultaneously acts as a thermal bridge.

To overcome this disadvantage, therefore, fiber-reinforced PVC profiles have been well established in the market for some time now. In EP 2 191 090 B1, for example, the introduction of short glass fibers into the PVC matrix is described, allowing the use of a metal reinforcement to be omitted in many applications.

To increase the length of the reinforcing fibers introduced by way of extrusion in the end product, it is proposed in EP 2 953 775 A1 to provide the corresponding reinforcing fibers with a PVC sheath before they are introduced into the extrusion process as pellets, providing a certain protection against the high mechanical load on the fibers in the extrusion process. In this way, a longer fiber length in the end product, and therefore a higher mechanical rigidity, can be ensured.

A further improvement in the mechanical properties is achieved together with good thermal insulation by introducing non-metallic reinforcement strips, for example organosheets, into the hollow-chambered profile. A method of this type is described in EP 2 493 673 A1. These organosheets generally include continuous fibers and can therefore significantly increase the mechanical load-bearing capacity of the profile once again.

By the measures described above, a considerable increase in rigidity can be achieved compared with an unreinforced PVC profile. For many applications, however, this is still insufficient. For this reason, for door or window frames with very large glazing areas of over several square meters, for example, aluminum profiles, which have excellent mechanical strength, are often still used. The poor thermal insulation properties are, of course, a disadvantage of these profiles, which is why profiles of this type have to be equipped with comparatively complex thermal break constructions. A further disadvantage of aluminum profiles is also the fact that they have a comparatively high weight and are very expensive.

Methods having the features described at the beginning are known, for example, from EP 2 528 723 B1 and from WO 2018/072878 A1. With the aid of the pultrusion processes disclosed therein, continuous profiles having very high rigidity can be produced. However, these methods generally have the disadvantage that, compared with extrusion processes, they can only be operated at a comparatively low production rate, since impregnation of the reinforcing fibers with the matrix material over the whole surface is essential for the mechanical performance of the continuous profiles produced.

SUMMARY OF THE DISCLOSURE

Against this background, the invention is based on the object of providing a method having the features described at the beginning, which allows an increased production rate.

According to the invention, this object is achieved in that the hardening of the core profile takes place using a dual cure method. Dual cure methods are known in principle in practice, e.g. for hardening thermosetting materials, and refer in general to the combination of two different hardening mechanisms, e.g. by irradiating with light waves on the one hand and with long-wave heat rays on the other hand. Traditional pultrusion with thermal hardening is slow and often uneconomical. Electron beam curing or curing by UV radiation does allow significantly shorter hardening times and higher production rates. However, a disadvantage of radiation curing on its own is the limited penetration depth of the radiation, so that it is only possible to cure regions of the pultrusion profile close to the surface by this method. By the use according to the invention of a dual cure method, the advantages of the individual curing mechanisms can be combined, and a complete full cure of the continuous profile can be achieved even at high throughput rates. In this context, it is in particular also advantageous if the feed material for the pultrusion matrix is of low viscosity to facilitate wetting of the reinforcing fibers with this material. Preferably, therefore, the feed material for producing the polymeric matrix has a dynamic viscosity of 100-10,000 MPas, preferably 500-1000 MPas, at 20° C. The proportion by weight of the reinforcing fibers in the core profile is expediently 50 to 85%. The wall thickness of the core profile may be, for example, in the range of 1 to 8 mm.

For example, the feed material for producing the core profile comprises at least two components, which can be hardened using different curing methods. For instance, a first component may be UV-reactive (e.g., an acrylate and/or a methacrylate having isocyanate-reactive groups) and, for example, may be combined with a second component comprising functional groups for another curing mechanism, e.g. using heat or microwaves. This second component may comprise e.g. an X—H—, e.g. OH—, NH— or SH—, terminated component. In general, pigments, e.g. color pigments, flame retardants (e.g. aluminum trihydrate), UV stabilizers, non-stick additives (e.g. siloxane, fluorine) and/or surface-active additives may also be added to the matrix material of the core profile. Within the scope of a preferred embodiment of the invention, the feed material for producing the core profile comprises polythiols, methyl methacrylates, lactams or stabilized one-component systems, in particular stabilized thiols. The aforementioned materials are expediently distinguished by the fact that they are easy-flowing and therefore allow impregnation of the reinforcing fibers at a high production rate. These materials may be combined with isocyanates, epoxy resins, acrylates or polysulfides, for example.

The continuous strand having reinforcing fibers may comprise continuous reinforcing fibers aligned unidirectionally in the direction of the profile. However, it is also within the scope of the invention that this reinforcement strand comprises at least one roving, at least one woven fabric, at least one nonwoven or at least one tape composed of reinforcing fibers. The reinforcing fibers themselves are preferably in the form of glass and/or carbon fibers and/or mineral and/or polymer and/or natural fibers.

The dual cure method is preferably made up of a UV cure and a heat cure. In particular here, the heat cure may be downstream of the UV cure. It is also within the scope of the invention, of course, if more than two curing methods are used, i.e. the dual cure method according to the invention is supplemented by at least one further curing process. Furthermore, as an alternative to the UV cure, in particular an electron beam cure may also be performed. It is furthermore within the scope of the invention that a thermal hardening at significantly elevated temperatures, e.g. above 100° C., is combined with a second hardening process, which takes place at ambient temperature. The individual curing methods mentioned above may also, of course, be combined in any order to provide a dual cure method, i.e., for example, a UV cure with a downstream cure at ambient temperature, and a UV cure with a downstream electron beam cure, or vice versa, etc.

To improve the surface quality of the continuous profile, or to color it, the core profile is expediently provided with an extruded outer, thermoplastic coating, which is preferably unreinforced, i.e., free from reinforcing fibers, immediately after being shaped—similarly to the procedure in a coextrusion, as it were. In this case, it is advantageous if the coating is made from a polymer adhering to the core profile, in particular a polyacrylate, a polyester or a polyamide. It is furthermore within the scope of the invention that color pigments are added to the material of the coating before it is applied to the core profile.

According to a preferred embodiment of the invention, the second curing process of the dual cure method is a heat cure, the input of heat required for this taking place by the application of the hot extrusion melt of the coating to the core profile. This means that the method step of the heat cure of the core profile is combined here with the application of the coating, which both simplifies the process engineering and reduces the energy requirement for the profile production.

The invention furthermore provides a continuous profile, which was produced by the method according to the invention as described above. In particular, the continuous profile may take the form of an outer frame profile or sash frame profile of a window or of a door. However, it is also within the scope of the invention that, for example, the continuous profile takes the form of a rail profile, preferably having a symmetrical cross-section, for a sliding cover of a freezer cabinet. In this case, during or after the pultrusion, a curved shape is expediently applied to the continuous profile in the axial direction. Other intended uses of the continuous profile produced according to the invention are not hereby excluded, however. The method according to the invention can be operated at production rates of at least 2 m/min, e.g. 2-20 m/min, in particular 3-8 m/min.

BRIEF DESCRIPTION OF THE DRAWINGS

The invention will be explained in detail below with reference to a drawing representing only one exemplary embodiment. The figures show schematically:

FIG. 2a-c: hollow-chambered profiles produced according to the invention, for example by a method according to FIG. 1, in a cross-sectional illustration, FIG. 3a, b: further embodiments of the teaching according to the invention and

DETAILED DESCRIPTION

Figure 1:
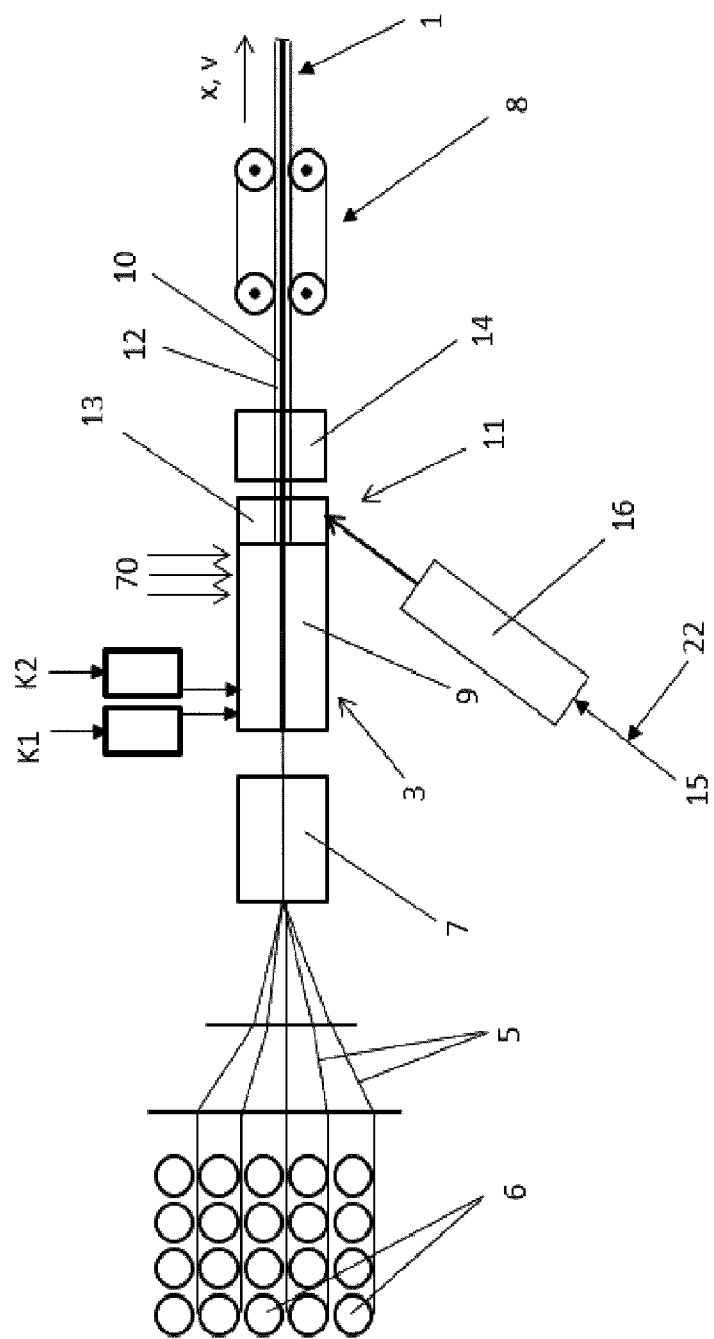
FIG. 1: a method according to the invention for producing a hollow-chambered window profile.

FIG. 1 shows a method according to the invention for producing a continuous fiber-reinforced polymeric hollow-chambered window profile 1. The hollow-chambered profile 1 comprises a core profile 10 having a plurality of hollow chambers 2, 2' (see FIG. 2a-c), which is produced with the aid of a pultrusion process 3 at 80 to 240° C., preferably 120-200° C. During this pultrusion process 3, continuous glass reinforcing fibers 5 are integrated into the polymeric matrix 4 of the core profile 10, said fibers being firstly drawn off from rolls 6 and preheated in a preheating station 7. Using a pulling tool 8, the freshly produced core profile 10 is pulled out from the heated pultrusion die 9 in the production direction x over the continuous reinforcing fibers 5. The polymeric matrix 4 of this core profile 10 here is produced from low-viscosity components K1 and K2, which are hardened by two different curing mechanisms by way of a dual-cure method. The components K1 and K2 for producing the polymeric matrix 4 have a dynamic viscosity of 500-1000 MPas at 20° C. and comprise, for example, polythiols, methyl methacrylates, lactams, or stabilized thiols.

In the exemplary embodiment, the dual cure method is made up of a UV cure of the component K1 and a heat cure of the component K2, the heat cure being downstream of the UV cure. Initially, therefore, immediately after the impregnation of the reinforcing fibers 5 with the components K1 and K2, a UV cure of the component K1 takes place by appropriate irradiation 70, for example using a mercury vapor lamp or LED. As an alternative to the UV cure, an electron beam cure using an EBC source may also be performed by using appropriately curable materials for the component K1.

The core profile 10 produced by the pultrusion 3 is provided by way of a coextrusion 11, as it were, with an extruded outer coating 12 composed of an unreinforced polymer 15, e.g. a polyacrylate, a polyester or a polyamide, adhering to the core profile 10, to improve the surface quality of the hollow-chambered profile 1 after it has been shaped at a temperature of 160-300° C., preferably 200-260° C. In the exemplary embodiment according to FIG. 1, this coextrusion 11 takes place using an extruder 16 immediately following the pultrusion 3 without intermediate cooling. The coextrusion die 13 here is arranged immediately after the outlet of the die 9 for the pultrusion 3 and sheathes the core profile 10 online. In the exemplary embodiment, the second curing process of the dual cure method for hardening the component K2 is a heat cure, the input of heat required for this taking place by the application of the hot extrusion melt of the coating to the core profile 10. Consequently, therefore, in the exemplary embodiment the second step of the dual cure method for hardening the component K2 and the coextrusion 11 of the coating 12 are brought together to form a combined method step. Only then is the coextruded hollow-chambered profile 1 cooled in a cooling apparatus 14, e.g. a water bath. The production rate v for producing the hollow-chambered profile 1 is at least 2 m/min, e.g. 2-10 m/min.

FIGS. 2a to 2c show hollow-chambered window profiles 1 produced according to the invention, which can be produced by the method described in FIG. 1, for example. The enlarged cutout of FIG. 2a shows the reinforcing fibers 5 embedded in the thermoplastic matrix 4 of the core profile 10 (colored black in FIGS. 2a to 2c), as well as the coating 12, shown here with exaggerated thickness, composed of the coating material 15. The coating 12 has a layer thickness s of 0.1 to 1 mm, preferably 0.2 to 0.5 mm. The proportion by weight of the reinforcing fibers 5 in the core profile 10 is more than 80% in the exemplary embodiment. In the exemplary embodiment according to FIG. 2a, two further hollow chambers 2' are formed jointly by the core profile 10 comprising a plurality of hollow chambers 2, and the coating 12. Accordingly, in this exemplary embodiment, the coating 12 is applied only to some regions of the outer surface of the core profile 10; in the connecting regions 17 of the hollow chambers 2' formed jointly by core profile 10 and coating 12, no coating of the outer surface of the core profile 10 took place, since these connecting regions 17 are not outwardly visible. In all the exemplary embodiments according to FIGS. 2a to 2c, the hollow-chambered profiles 1 furthermore comprise functional elements 18, 18' in the form of receiving grooves for sealing elements and/or latching elements (not shown), the receiving grooves 18 in FIGS. 2a and 2b each being formed solely by the material 15 of the coating 12—i.e., without core profile 10. In FIG. 2c, in contrast, the functional elements 18 are also each formed by a coated cross-sectional region of the core profile 10, i.e., the core profile 10 here contributes significantly to the shape of the functional elements. In FIGS. 2a to 2c, the hollow-chambered window profile 1 is in the form of a sash frame profile. Accordingly here, the core profile 10 has in each case a rebate base 19 for receiving at least one glass pane (not shown). In FIGS. 2b and 2c, the coating 12 is applied to almost the whole area of the outer surface of the core profile 10. Only the groove base of the right-hand receiving groove 18' in each case is formed solely by the core profile 10, this being applicable also to the exemplary embodiment according to FIG. 2a. Furthermore, in all three exemplary embodiments according to FIGS. 2a to 2c, protrusions 20 of a euro groove 21 of the hollow-chambered profile 1 for receiving locking elements (not shown) are formed only by the coating 12.

The hollow-chambered profiles 1 shown in FIGS. 2a to 2c may be appropriately colored by adding color pigments 22 to the material 15 of the coating 12 before it is applied to the core profile 10. Apart from the use of traditional white pigments 22, e.g. titanium dioxide, in particular color pigments 22 may also be used, which impart a "true" color to the coating 12 and lead, e.g., to a red, green, blue, grey, yellow, or even black coloring of the hollow-chambered profile 1. It is not shown in the exemplary embodiments, but is likewise possible within the scope of the invention, that the outer coating is applied to the core profile 10 as a liquid and/or powder and then hardened to form a lacquer coat.

In the exemplary embodiment according to FIG. 3a, the hollow-chambered window profile 1 is in the form of a core element which is provided on each of the inside and the outside with a casing 30, 30'. These casings 30, 30' may each consist of aluminum, wood or likewise of plastics, and define the design of the overall profile made up of the elements 1, 30, 30'. In the case of the formation of a door frame or window frame having, e.g., four corners, there is no need for a corner connection of each of the casings 30, 30' to one another, since the corner connections of the overall frame are produced by corresponding corner welds of the mitered hollow-chambered window profiles 1 (i.e., in this case, the core elements).

In the exemplary embodiment according to FIG. 3b, a rectangular hollow-chambered frame 100 of a window profile or door profile is formed by first appropriately mitering a hollow-chambered profile 1 according to the invention at each of the corners 50 such that only the outer wall 60 remains there. By bending the remaining outer wall 60 at each of the corners 50, the hollow-chambered frame 100 is then formed. The entire hollow-chambered frame 100 here (conventionally made up of four profiles) thus consists of a single hollow-chambered profile 1, which is connected, preferably welded, to itself at one of the corners to form the closed frame 100. It is advantageous here that the reinforcing fibers 5 extend all the way round in the outer wall 60 and thus contribute to very high stability.

The invention claimed is:

1. A method for producing a fiber-reinforced polymeric continuous profile,
wherein the continuous profile comprises a core profile which is produced with the aid of a pultrusion process,
wherein at least one continuous strand having reinforcing fibers is integrated into the polymeric matrix of the core profile during the pultrusion process,
wherein the core profile is provided with an extruded outer, thermoplastic coating immediately after being shaped,
wherein the hardening of the core profile takes place using a dual cure method,
wherein a second curing process of the dual cure method is a heat cure, and
wherein an input of heat for the heat cure is via the application of a hot extrusion melt of the coating to the core profile.

2. The method according to claim 1, characterized in that the feed material for producing the polymeric matrix has a dynamic viscosity of 100-10,000 MPas at 20° C.

3. The method according to claim 1 or 2, characterized in that the feed material for producing the core profile comprises polythiols, methyl methacrylates, lactams or stabilized one-component systems.

4. The method according to claim 1, characterized in that the dual cure method is made up of a UV cure and a heat cure.

5. The method according to claim 4, characterized in that the heat cure is downstream of the UV cure.

6. The method according to claim 1, characterized in that the coating is made from a polymer adhering to the core profile.

7. The method according to claim 6, characterized in that color pigments are added to the material of the coating before it is applied to the core profile.

8. The method according to claim 1, wherein the continuous profile comprises at least one hollow chamber.

9. The method according to claim 1 or 2, characterized in that the feed material for producing the polymeric matrix has a dynamic viscosity of 500-1000 MPas, at 20° C.

10. The method according to claim 3, characterized in that the feed material for producing the core profile comprises stabilized thiols.

11. The method according to claim 6, characterized in that the coating is made from a polymer that comprises a polyacrylate, a polyester or a polyamide.

* * * * *